(12) United States Patent
Sun

(10) Patent No.: US 10,442,722 B2
(45) Date of Patent: *Oct. 15, 2019

(54) OPTICAL GLASS

(71) Applicant: CDGM GLASS CO., LTD, Chengdu, Sichuan (CN)

(72) Inventor: Wei Sun, Chengdu (CN)

(73) Assignee: CDGM GLASS CO., LTD, Chengdu, Sichuan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/751,295

(22) PCT Filed: Aug. 10, 2016

(86) PCT No.: PCT/CN2016/094354
§ 371 (c)(1),
(2) Date: Feb. 8, 2018

(87) PCT Pub. No.: WO2017/028725
PCT Pub. Date: Feb. 23, 2017

(65) Prior Publication Data
US 2018/0222786 A1 Aug. 9, 2018

(30) Foreign Application Priority Data
Aug. 14, 2015 (CN) .......................... 2015 1 0502457

(51) Int. Cl.
*C03C 3/068* (2006.01)
*C03C 3/155* (2006.01)

(52) U.S. Cl.
CPC .............. *C03C 3/068* (2013.01); *C03C 3/155* (2013.01)

(58) Field of Classification Search
CPC ............ C03C 3/068; C03C 3/15; C03C 3/155
See application file for complete search history.

(56) References Cited

U.S. PATENT DOCUMENTS

| | | | |
|---|---|---|---|
| 5,952,256 A | 9/1999 | Morishita et al. | |
| 7,638,450 B2 | 12/2009 | Ritter et al. | |
| 2006/0247119 A1 | 11/2006 | Ritter et al. | |
| 2018/0230038 A1* | 8/2018 | Sun .................. | C03C 3/155 |

FOREIGN PATENT DOCUMENTS

| | | | |
|---|---|---|---|
| CN | 1198414 A | 11/1998 | |
| CN | 101386469 A | 3/2009 | |
| CN | 102765879 A | 11/2012 | |
| CN | 103319086 A | 9/2013 | |
| JP | 2001-348244 A | 12/2001 | |
| JP | 3347106 B2 | 11/2002 | |
| JP | 2006-306717 A | 11/2006 | |
| JP | 2007-269584 A | 10/2007 | |
| JP | 2012229148 A | * | 11/2012 |
| JP | 2012236754 A | * | 12/2012 |

OTHER PUBLICATIONS

Oct. 26, 2016 Search Report issued in International Patent Application No. PCT/CN2016/094354.

* cited by examiner

*Primary Examiner* — Elizabeth A. Bolden
(74) *Attorney, Agent, or Firm* — Oliff PLC

(57) ABSTRACT

A high refraction low dispersion optical glass, the components thereof including, by weight percentage: $B_2O_3$: 1-30%; $SiO_2$: 0-20%; $La_2O_3$: 25-55%; $Gd_2O_3$: 5-40%; $Y_2O_3$: 0-25%; $Yb_2O_3$: 0-10%; $Ta_2O_5$: 0-10%; $Nb_2O_5$: 1-30%; $TiO_2$: 0-10%; $ZrO_2$: 0.5-20%; $WO_3$: 0-10%; ZnO: 0-15%; $R_2O$: 0-10%; RO: 0-10%; $Al_2O_3$: 0-10%; $GeO_2$: 0-10%; $Bi_2O_3$: 0-10%. A high refraction low dispersion environmentally friendly optical glass having excellent light transmittance may be obtained by reducing the $Ta_2O_5$ content within the glass components and introducing suitable amounts of rare earth oxide components having a high refraction low dispersion effect.

10 Claims, No Drawings

OPTICAL GLASS

TECHNICAL FIELD

The invention relates to an optical glass with high refractive index and low dispersion, and a glass preform and an optical element made of the above optical glass.

BACKGROUND

A lens made of high-refraction low-dispersion optical glass and a lens made of high-refraction high-dispersion optical glass can be combined for chromatic aberration correction and optical system miniaturization. Especially, the market demands on the high-refraction low-dispersion environmental optical glass with refractive index nd of 1.86-1.92 and Abbe number vd of 36-42 are increasing.

JP2001-348244, JP2007-269584 and CN101386469A discloses such high-refraction low-dispersion optical glass, and the optical glass component with the refractive index of more than 1.86 in the embodiments of the Description contains a lot of $Ta_2O_5$, while $Ta_2O_5$ belongs to an expensive rare earth oxide. Thus, to inhibit the cost of high-refractive index and low-dispersion optical glass material from increasing, it is hopeful to reduce the content of $Ta_2O_5$. Meanwhile, the optical element of the optical system for camera shooting or projecting, etc. has higher requirements for the transmittance of optical glass, and the transmission light of the optical system will be affected if the transmission light of the lens formed by high-refraction low-dispersion optical glass is not enough, therefore optical glass is hopeful to have an excellent transmittance.

SUMMARY

The technical problem to be solved by the present invention is to provide a high-refraction low-dispersion optical glass with glass refractive index of more than 1.85 and Abbe number of 35-45. The glass contains no PbO, and has an excellent transmittance when the content of $Ta_2O_5$ in a glass component is reduced.

The present invention also provides a glass preform and an optical element made of the above optical glass.

To solve the technical problem, the technical scheme of the present invention provides: An optical glass, comprising by weight percentage: $B_2O_3$: 1-30%; $SiO_2$: 0-20%; $La_2O_3$: 25-55%; $Gd_2O_3$: 5-40%; $Y_2O_3$: 0-25%; $Yb_2O_3$: 0-10%; $Ta_2O_5$: 0-10%; $Nb_2O_5$: 1-30%; $TiO_2$: 0-10%; $TiO_2/Nb_2O_5$: less than 0.3; $ZrO_2$: 0.5-20%; $WO_3$: 0-10%; $ZnO$: 0-15%; $(ZnO+Y_2O_3)/La_2O_3$: less than 0.5; $R_2O$: 0-10%, in which $R_2O$ is one or more of $Li_2O$, $Na_2O$ or $K_2O$; RO: 0-10%, in which, RO is one or more of BaO, SrO, MgO or CaO; $Al_2O_3$: 0-10%; $GeO_2$: 0-10%; $Bi_2O_3$: 0-10%; the glass contains no PbO; the glass refractive index is more than 1.85, and the Abbe number is 35-45.

The optical glass further contains $Sb_2O_3$: 0-1%; $SnO_2$: 0-1%; $CeO_2$: 0-1%.

It contains $B_2O_3$: 5-25% and/or $SiO_2$: 0.1-15% and/or $La_2O_3$: 30-52% and/or $Gd_2O_3$: 5-35% and/or $Y_2O_3$: 1-20% and/or $Ta_2O_5$: 0-5% and/or $Nb_2O_5$: 2-25% and/or $TiO_2$: 0.1-5% and/or $ZrO_2$: 1-15% and/or $WO_3$: 0-5% and/or $ZnO$: 0-10% and/or $R_2O$: 0-5% and/or RO: 0-5% and/or $Al_2O_3$: 0-5% and/or $GeO_2$: 0-5% and/or $Bi_2O_3$: 0-5% and/or $Sb_2O_3$: 0-0.5% and/or $SnO_2$: 0-0.5% and/or $CeO_2$: 0-0.5%.

$SiO_2/(SiO_2+B_2O_3)$ is less than 0.5; and/or $Y_2O_3/(La_2O_3+Gd_2O_3+Y_2O_3)$ is less than 0.2; and/or $Nb_2O_5 \geq ZrO_2$; and/or $Nb_2O_5/(Nb_2O_5+TiO_2+ZrO_2)$ ranges from 0.4 to 0.8; and/or $(Nb_2O_5+Ta_2O_5+ZrO_2)/(SiO_2+B_2O_3)$ is less than 1; and/or $(ZnO+Y_2O_3)/La_2O_3$ ranges from 0.05 to 0.3.

$SiO_2/(SiO_2+B_2O_3)$ ranges from 0.25 to 0.4; and/or $Y_2O_3/(La_2O_3+Gd_2O_3+Y_2O_3)$ is 0.05-0.12; and/or $Nb_2O_5/(Nb_2O_5+TiO_2+ZrO_2)$ ranges from 0.48 to 0.6; and/or $(Nb_2O_5+Ta_2O_5+ZrO_2)/(SiO_2+B_2O_3)$ ranges from 0.1 to 0.9; and/or $(ZnO+Y_2O_3)/La_2O_3$ ranges from 0.08 to 0.15.

$(Nb_2O_5+Ta_2O_5+ZrO_2)/(SiO_2+B_2O_3)$ ranges from 0.5 to 0.8.

The glass refractive index ranges from 1.87 to 1.91; the Abbe number ranges from 37 to 41.

The glass refractive index ranges from 1.88 to 1.90; the Abbe number ranges from 38 to 40.

A glass preform is made of the above-mentioned optical glass.

An optical element is made of the above optical glass.

The advantages of the present invention are as follows: The high-refractive index and low-dispersion environmental optical glass with excellent transmittance, as well as a glass preform and an optical element made of the optical glass can be obtained by lowering the content of $Ta_2O_5$ in the component, and then introducing an approximate amount of such rare earth oxide components with high refraction and low dispersion as $La_2O_3$, $Gd_2O_3$, $Y_2O_3$ and $Yb_2O_3$ as well as an approximate proportion of one or more of $Nb_2O_5$ or $TiO_2$, optimizing the proportions of these components, and the glass containing no PbO.

DETAILED DESCRIPTION

I. Optical Glass

The composition of the optical glass provided by the present invention will be described in detail below, and the ratio of the content to the total content of each glass component is expressed by weight percentage unless otherwise the content and the total eight of each glass component are specified. In the following description, if referred to below or above the prescribed value, the prescribed value is included.

$B_2O_3$ is a glass network forming component having effects of improving glass meltability and reducing glass transition temperature. In order to achieve the above-mentioned effects, the present invention introduces 1% or more of $B_2O_3$. However, when the introduced amount is more than 30%, the glass stability will be lowered and the refractive index will be lowered, so that the high refractive index of the present invention cannot be obtained. Therefore, the content of $B_2O_3$ in the present invention is 1-30%, preferably 5-25%, and more preferably 7-20%.

$SiO_2$ has an effect of improving the heat stability of glass, and can increase the viscosity in glass melting and forming. However, if the content exceeds 20%, the glass will be hard to melt, and the refractive index required for the present invention cannot be obtained. Therefore, the content of $SiO_2$ in the present invention is 0-20%, preferably 0.1-15%, and more preferably 3-12%.

To improve the glass meltbility, maintain the glass stability and keep the viscosity applicable to forming molten glass, the content of $SiO_2$ introduced into the present invention shall be less than or equal to the content of $B_2O_3$, i.e. $SiO_2 \leq B_2O_3$.

In the meantime, to obtain glass with high transmittance, inhibit the glass melting temperature from rising, reduce and prevent the mixture of platinum ions molten into molten glass from making coloring deteriorate, and effectively adjust the Abbe number of glass in the present invention, the $SiO_2/(SiO_2+B_2O_3)$ in the present invention will be preferably less than 0.5, more preferably 0.1-0.45, and further preferably 0.25-0.4.

$La_2O_3$ is an essential component for obtaining the optical properties required for the present invention. When the content of $La_2O_3$ is less than 25%, it is difficult to achieve the required optical properties; but when its content exceeds 55%, the glass devitrification resistance and melting properties are deteriorated. Therefore, the content of $La_2O_3$ in the present invention is 25-55%, preferably 30-52%, and more preferably 35-50%.

The stability of the glass can be improved through coexistence of $Gd_2O_3$ and $La_2O_3$ in the present invention, but when the content of $Gd_2O_3$ is lower than 5%, the above effect is not obvious; when its content exceeds 40%, the glass devitrification resistance is reduced, and the glass stability is worsened. Therefore, the content of $Gd_2O_3$ in the present invention is 5-40%, preferably in the range of 5-35%, more preferably in the range of 10-30%.

The high-refraction and low-dispersion component of the present invention is also preferably introduced into $Y_2O_3$, which can improve the meltability and devitrification resistance of the glass. In addition, it can reduce the upper limit of devitrification temperature of the glass, but if its content exceeds 25%, the glass stability and devitrification resistance will be decreased. Thus, the $Y_2O_3$ content is in the range of 0-25%, preferably in the range of 1-20%, more preferably 2-15%.

$Yb_2O_3$ is also a high-refractive index and low-dispersion component of the glass in the present invention. When its content exceeds 10%, the glass stability and devitrification resistance will be decreased, so the content of $Yb_2O_3$ is preferably in the range of 0-10%. Meanwhile, compared with $Gd_2O_3$, $Y_2O_3$, $Yb_2O_3$ is more expensive, and has a little effect on improving the meltability of glass, thus it is preferably not introduced.

In $La_2O_3$, $Gd_2O_3$, $Y_2O_3$ and $Yb_2O_3$, the component with the greatest impact on improving glass refractive index and maintaining glass stability is $La_2O_3$. However, if only $La_2O_3$ is used in the optical glass of the present invention, it is difficult to ensure the sufficient glass stability. Thus, the introduced amount of $La_2O_3$ in the present invention is the most, and $La_2O_3$ is made to coexist with $Gd_2O_3$; or preferably $La_2O_3$ and $Gd_2O_3$ are made to coexist with $Y_2O_3$; more preferably $Y_2O_3/(La_2O_3+Gd_2O_3+Y_2O_3+Yb_2O_3)$ is less than 0.2, further preferably $Y_2O_3/(La_2O_3+Gd_2O_3+Y_2O_3)$ is in the range of 0.01-0.15, and furthermore preferably $Y_2O_3/(La_2O_3+Gd_2O_3+Y_2O_3)$ is in the range of 0.05-0.12. The high-refractive index and low-dispersion glass with excellent glass stability can be obtained, while the glass is not easy to be colored.

$Nb_2O_5$ has an effect of improving glass refractive index and dispersion, as well as an effect of improving devitrification resistance and chemical durability of glass. However, when the content of $Nb_2O_5$ is less than 1%, the above effect cannot be reached; if the content exceeds 30%, the glass dispersion is improved, and the optical property of glass in the present invention cannot be reached, meanwhile the devitrification resistance of glass is deteriorated. Therefore, the content of $Nb_2O_5$ is 1-30%, preferably 2-25%, more preferably 3-20%, and further preferably 4-15%.

$Ta_2O_5$ can increase the refractive index and does better than $Nb_2O_5$ in maintaining the low dispersion of glass, and if the stability of glass requires further improvement, a small quantity of $Ta_2O_5$ can be introduced to replace part of $Nb_2O_5$. However, $Ta_2O_5$ is very expensive when compared with other components, hence, its usage is reduced in the present invention from the perspectives of utility and cost. The content of $Ta_2O_5$ in the present invention is 0-10%, preferably 0-5%, and more preferably not introduced.

$TiO_2$ can increase the refractive index as well and can be involved in the formation of glass network, the appropriate introduction of which can make glass stabler. Instead, the over content will significantly increase the dispersion of glass and decrease the transmittance of the short wave in the visible region, increasing the tendency of glass coloring. Therefore, the preferable content of $TiO_2$ in the present invention is 0-10%, more preferably 0.1-5%, and further preferably 0.5-3%.

When the introduced amount of $Ta_2O_5$ is reduced or $Ta_2O_5$ is not introduced as the glass components of the present invention, through the introduction of $Nb_2O_5$ or $TiO_2$, it is preferable to coexist $TiO_2$ and $Nb_2O_5$ as glass components, more preferably control $TiO_2/Nb_2O_5$ under 0.3, further preferably under 0.25 and more further preferably under 0.2, so as to enable the high refraction and low dispersion, and provide good stability of glass whilst effectively control the degree of pigmentation.

For the present invention, the refractive index and stability of glass can be improved through the introduction of a little $ZrO_2$ (0.5% or more); it will be difficult to melt glass and obtain uniform glass when the amount of $ZrO_2$ introduced exceeds 20%. Therefore, the content of $ZrO_2$ in the present invention is 0.5-20%, preferably 1-15%, and more preferably 3-10%.

The present invention preferably limits the introduced amount of $Nb_2O_5$ in glass components to be greater than or equal to that of $ZrO_2$, i.e., $Nb_2O_5 \geq ZrO_2$, to effectively suppress the glass coloring and improve the property of devitrification resistance. The more preferable range of $Nb_2O_5/(Nb_2O_5+TiO_2+ZrO_2)$ for the present invention is 0.4-0.8, further preferably 0.45-0.7 and more further preferably 0.48-0.6, which can further effectively suppress the glass coloring and increase the transmittance.

The present invention also preferably controls the ratio of the total amount of $Nb_2O_5$, $Ta_2O_5$ and $ZrO_2$ ($Nb_2O_5+Ta_2O_5+ZrO_2$) to the total amount of $SiO_2$ and $B_2O_3$($SiO_2+B_2O_3$), that is, the preferable ratio range of $(Nb_2O_5+Ta_2O_5+ZrO_2)/(SiO_2+B_2O_3)$ is less than 1, more preferably 0.1-0.9, further preferably 0.5-0.8, which can reach the preferable ranges of refractive index and Abbe number, as well as effectively suppress the glass coloring and increase the heat stability and devitrification resistance of glass.

$WO_3$ can increase the refractive index. If its content exceeds 10%, dispersion will be significantly increased, the transmittance on the long side of short waves in glass's visible region will be decreased and the tendency of coloring will be increased. Therefore, the preferable content of $WO_3$ in the present invention is 0-10%, more preferably 0-5%, further preferably 0-3%, and more further preferably not introduced.

Proper ZnO can improve the stability or meltbility of glass and the effect of compression molding, but its excessive content will reduce the refractive index which cannot meet the requirements of the present invention, decrease the devitrification resistance and increase the liquidus temperature of glass. Therefore, the preferable content of ZnO in the present invention is 0-15%, more preferably 0-10%, further preferably 0-5%, and more further preferably not introduced.

Among the components of glass, the preferable range of $(ZnO+Y_2O_3)/La_2O_3$ in the present invention is under 0.5, more preferably 0.05-0.3 and further preferably 0.08-0.15, which can be more favorable to improve the stability of glass and lower the transition temperature.

$R_2O$ ($R_2O$ is one or more of $Li_2O$, $Na_2O$ or $K_2O$) can improve the meltbility and lower the transition temperature of glass, but when its content exceeds 10%, the stability of glass will become worse and the refractive index will be greatly decreased. Therefore, the preferable content of $R_2O$ in the present invention is 0-10%, more preferably 0-5%, and further preferably not introduced.

RO (RO is one or more of BaO, SrO, CaO or MgO) can improve the meltbility and lower the transition temperature of glass, but when its content exceeds 10%, the devitrification resistance of glass will be lowered. Therefore, the preferable content of RO in the present invention is 0-10%, more preferably 0-5%, and further preferably not introduced.

By introducing a small amount of $Al_2O_3$, the stability and chemical stability of glass can be improved. However, when its content exceeds 10%, the glass will have a tendency to deteriorate the meltbility and lower the devitrification resistance. Therefore, the preferable content of $Al_2O_3$ in the present invention is 0-10%, more preferably 0-5%, and further preferably not introduced.

$Bi_2O_3$ can increase the refractive index of glass, but its excessive content will lower the transmittance on the long side of short waves in the visible region and show a tendency of coloring. Therefore, the preferable content of $Bi_2O_3$ in the present invention is 0-10%, more preferably 0-5% and further preferably not introduced.

$GeO_2$ can effectively improve the stability and devitrification resistance of glass as well. As $GeO_2$ is very expensive, the preferable content of $GeO_2$ is 0-10%, more preferably 0-5% and further preferably not introduced.

The clarification effect of glass can be increased by adding a little $Sb_2O_3$, $SnO_2$ and $CeO_2$. However, when the $Sb_2O_3$ content exceeds 1%, the glass will show a tendency of lowering the clarification property, and its strong oxidation promotes the deterioration of the shaped mould. Therefore, the preferable addition amount of $Sb_2O_3$ is 0-1%, more preferably 0-0.5%, and further preferably not added. $SnO_2$ can also be added as a clarifying agent, but when its content exceeds 1%, the glass will be colored, or when the glass is heated, softened, and molded for reshaping, Sn will become a starting point for nucleation, resulting in a tendency of devitrification. Therefore, the preferable content of $SnO_2$ in the present invention is 0-1%, more preferably 0-0.5%, and further preferably not added. The role and the proportion of the added amount of $CeO_2$ are consistent with $SnO_2$, so the preferable content of $CeO_2$ is 0-1%, more preferably 0-0.5%, and further preferably not added.

In addition, the raw materials of glass introduced in the form of nitrate, carbonate or sulfate can also increase the defoamability. In the present invention, one or more of $Sb_2O_3$, $SnO_2$ or $CeO_2$ can be combined with one or more of the above nitrate, carbonate or sulfate, being effective as well.

F is a component effectively lowering dispersion and reducing transition temperature of glass, but its excessive content will show a tendency of significantly decreasing the refractive index of glass or increasing the volatility of glass melt, forming texture when the glass melt is shaped, or increasing the refractive index changes due to volatilization. F, as a raw material, can be introduced with $YF_3$, $LaF_3$, $YbF_3$, $ZrF_4$, $ZnF_2$, alkali fluoride or alkaline earth fluoride. The percentage of F ion in the case of 100% total anion amount in glass can be taken into consideration for the introduced amount of F. Calculated by the percentage of anion, the preferable content of F in the present invention is 0-30%, more preferably 0-20%, and further preferably not introduced.

[Optical Properties of Optical Glass]

Hereinafter, the properties of the optical glass of the present invention will be described.

The optical glass of the present invention is a high-refraction low-dispersion glass, and a lens made of the high-refraction low-dispersion glass is combined with a lens made of high-refraction high-dispersion glass for chromatic aberration correction. The optical glass of the present invention has a glass refractive index in the range of above 1.85, preferably in the range of 1.87-1.91, more preferably in the range of 1.88-1.90, and further preferably in the range of 1.88-1.89, from the viewpoint of imparting optical properties suitable for its use. The range of the Abbe number $v_d$ of the glass of the present invention is in the range of 35-45, preferably in the range of 37-41 and more preferably in the range of 38-40.

[Coloring of Optical Glass]

The short-wave transmission spectrum characteristics of the glass of the present invention are represented by pigmentation degree ($\lambda_{70}/\lambda_5$). $\lambda_{70}$ refers to a wavelength corresponding to a glass transmittance of 70%, and $\lambda_5$ is a wavelength corresponding to a glass transmittance of 5%. The measurement of $\lambda_{70}$ is carried out using a glass having a thickness of 10±0.1 mm with two opposing planes parallel to each other and optically polished, measuring the spectral transmittance in the wavelength region from 280 nm to 700 nm and a wavelength exhibiting 70% of the transmittance. The spectral transmittance or transmittance is an amount indicated by $I_{out}/I_{in}$ in the case where light of the intensity $I_{in}$ is incident perpendicularly to the above surface of the glass, passes through the glass and emits light of the intensity $I_{out}$ from one plane, including the transmittance of the surface reflection loss on the above surface of the glass. The higher the refractive index of the glass, the greater the surface reflection loss. Thus, in high refractive index glass, a small value of $\lambda_{70}$ means that the glass itself is colored very little.

The $\lambda_{70}$ of optical glass provided by the present invention is less than or equal to 410 nm, preferably less than or equal to 400 nm, more preferably less than or equal to 385 nm, further preferably less than or equal to 378-385 nm, and most preferably in the range of 378-380 nm.

Optical elements of imaging optical system or projection optical system with balanced and fine colors can be provided through making $\lambda_{70}$ less than or equal to 410 nm. In addition, due to the little coloring and high refractive index low dispersion, imaging optical system and projection optical system can be miniaturized. Based on this, the optical glass of the present prevention is suitable to be used as the optical element for constituting imaging optical system and projection optical system, especially as the optical element for constituting the exchanging lenses of single-lens reflex camera.

[Transition Temperature of Optical Glass]

The optical glass will gradually turn from solid state to plastic state within a certain temperature range. The transition temperature refers to the temperature at which the glass sample is heated from room temperature to the sag temperature, and the temperature corresponding to the intersection of the low temperature region and the straight line extension of the high temperature region.

The glass of the present invention has a transition temperature Tg of below 735° C., preferably 710-735° C. and more preferably 715-725° C.

[Chemical Stability of Optical Glass]

In the process of manufacture and use, the capability of the glazed surface of optical glass components to resist various erosion media effects becomes the chemical stability of the optical glass.

The water resistance durability Dw (powdered method) and acid resistance durability $D_A$ (powdered method) of the glass provided by the present invention are above the category 2, preferably above the category 1.

The water resistance durability Dw (powdered method) is calculated as per the testing method specified in GB/T17129 according to the following formula:

$$D_W=(B-C)/(B-A)*100$$

in which: Dw—the leaching percentage of the glass (%)
B—the mass of the filter and the sample (g)
C—the mass of the filter and the eroded sample (g)
A—the mass of the filter (g)

The water resistance durability Dw of the optical glass is classified as six categories as per the calculated leaching percentage.

| | Category | | | | | |
|---|---|---|---|---|---|---|
| | 1 | 2 | 3 | 4 | 5 | 6 |
| Leaching percentage (Dw) | <0.04 | 0.04-0.10 | 0.10-0.25 | 0.25-0.60 | 0.60-1.10 | >1.10 |

The acid resistance durability $D_A$ (powdered method) is calculated as per the testing method specified in GB/T17129 according to the following formula:

$$D_A=(B-C)/(B-A)*100$$

in which: $D_A$—the leaching percentage of the glass (%)
B—the mass of the filter and the sample (g)
C—the mass of the filter and the eroded sample (g)
A—the mass of the filter (g)

The acid resistance durability $D_A$ of the optical glass is classified as six categories as per the calculated leaching percentage.

| | Category | | | | | |
|---|---|---|---|---|---|---|
| | 1 | 2 | 3 | 4 | 5 | 6 |
| Leaching Percentage ($D_A$) | <0.20 | 0.20-0.35 | 0.35-0.65 | 0.65-1.20 | 1.20-2.20 | >2.20 |

[Density of Optical Glass]

The density of the optical glass is the mass per unit volume at a temperature of 20° C., expressed in g/cm³.

The density of the glass of the present invention is below 5.3 g/cm³, preferably 5.15-5.3 g/cm³ and more preferably 5.15-5.2 g/cm³.

II. Optical Preform and Optical Element

Hereinafter, the optical preform and the optical element of the present invention will be described.

The optical preform and the optical element of the present invention are both formed by the optical glass of the present invention described above. The optical preform of the present invention has a high refractive index and low dispersion. The optical element of the present invention has a high refractive index and low dispersion, which can provide optical elements such as various lenses and prisms having a high optical value at a low cost.

Examples of the lens include various lenses with spherical or aspheric surfaces, such as concave meniscus lens, convex meniscus lens, biconvex lens, biconcave lens, planoconvex lens, and planoconcave lens.

This lens is combined with a lens made of high-refraction high-dispersion glass to correct the chromatic aberration, suitable as a lens for chromatic aberration correction. In addition, the lens is also effective for the compactness of the optical system.

In addition, for the prism, due to the high refractive index, by combining in the optical system, you can achieve a compact wide-angle optical system through the curved optical path, towards the desired direction.

Embodiment

The present invention is explained by the following embodiments, but the present invention should not be limited to these embodiments.

[Optical Glass Embodiment]

Firstly, carbonate, nitrate, sulfate, hydroxide, oxide, boric acid and so on are applied to obtain a glass No. 1-35 of a composition shown in Tables 1-4; various raw materials corresponding to the composition of optical glass are weighed in proportion for fully mixing to obtain a mixed raw material; the mixed raw material is placed into a platinum made crucible to be heated to 1380~1450° C., clarified and mixed for 3~5 hours to become uniform molten glass, which is poured into the preheated module and is slowly cooled after being kept for 2~4 hours at the temperature of 650~700° C., then various optical glasses of glass No. 1-35 is obtained.

In addition, the characteristics of each glass are measured by the following methods, and the measurement results are shown in Tables 1 to 4.

(1) Refractive Index Nd and Abbe Number vd

The refractive index and Abbe number are measured as per the method specified in GB/T7962.1-2010.

(2) Pigmentation Degree of Glass ($\lambda_{70}$, $\lambda_5$)

The spectral transmittance is measured by using a glass sample having a thickness of 10±0.1 mm with two opposing planes optically polished, and calculated on the basis of the result.

(3) Transition Temperature of Glass (Tg)

To measure as per the method specified in GB/T7962.16-2010.

(4) Proportion (ρ)

To measure as per the method specified in GB/T7962.20-2010.

(5) Chemical Stability $D_W$, $D_A$

To measure as per the testing method specified in GB/T17129 according to the Formula

TABLE 1

| Composition | Embodiment 1 | 2 | 3 | 4 | 5 | 6 | 7 | 8 | 9 | 10 |
|---|---|---|---|---|---|---|---|---|---|---|
| $B_2O_3$ | 18.56 | 7.26 | 9.34 | 15.3 | 15.2 | 14.25 | 14.21 | 11.2 | 9.16 | 14 |
| $SiO_2$ | 9.81 | 6.55 | 8.35 | 9.41 | 7.21 | 14.05 | 9.34 | 8.69 | 8.42 | 6.3 |
| $La_2O_3$ | 35.57 | 50 | 31.84 | 29.0 | 36.1 | 26.11 | 32.53 | 33.37 | 31 | 40.2 |
| $Gd_2O_3$ | 14.84 | 7.34 | 25.76 | 10.59 | 13.74 | 6.37 | 6.34 | 20.4 | 24.06 | 21.3 |
| $Y_2O_3$ | 8.87 | 5.61 | 1.82 | 2.17 | 3.05 | 5.68 | 1.52 | 9.4 | 2.73 | 1 |
| $Yb_2O_3$ | 0.16 | 1.85 | 3.67 | 0 | 5.21 | 4.17 | 2.74 | 3.22 | 0.87 | 0 |
| $ZrO_2$ | 2.31 | 2.64 | 3.54 | 5.12 | 2.52 | 6.33 | 3.15 | 1.23 | 2.37 | 6.6 |
| $Nb_2O_5$ | 8.03 | 6.31 | 6.14 | 17.71 | 8.99 | 9.36 | 18.09 | 3.62 | 11.47 | 9 |
| $Ta_2O_5$ | 0 | 3.25 | 2.57 | 1.00 | 0.74 | 4.17 | 2.14 | 4.51 | 1.25 | 0 |
| $TiO_2$ | 0.36 | 0.61 | 1.75 | 1.78 | 2.44 | 2.32 | 2.44 | 0.85 | 1.62 | 1.5 |
| $WO_3$ | 0 | 3.14 | 1.52 | 2.41 | 0 | 0.52 | 2.14 | 1.33 | 1.47 | 0 |
| ZnO | 0.74 | 2.33 | 0 | 0.78 | 2.12 | 0 | 4.03 | 0 | 2.73 | 0 |
| $R_2O$ | 0 | 0.25 | 0.57 | 0 | 1.47 | 3.24 | 0 | 0 | 0 | 0 |
| RO | 0.32 | 0 | 1.82 | 2.03 | 0 | 0 | 0 | 1.00 | 1.52 | 0 |
| $Al_2O_3$ | 0 | 1.24 | 1.11 | 0.18 | 0 | 3.31 | 1.33 | 0.63 | 1.20 | 0 |
| $GeO_2$ | 0.23 | 0.62 | 0 | 1.44 | 0 | 0 | 0 | 0 | 0 | 0 |
| $Bi_2O_3$ | 0 | 0 | 0 | 1 | 1.05 | 0 | 0 | 0 | 0 | 0 |
| $Sb_2O_3$ | 0.2 | 0 | 0.2 | 0 | 0 | 0.12 | 0 | 0 | 0.13 | 0.1 |
| $SnO_2$ | 0 | 1 | 0 | 0 | 0.16 | 0 | 0 | 0.55 | 0 | 0 |
| $CeO_2$ | 0 | 0 | 0 | 0.08 | 0 | 0 | 0 | 0 | 0 | 0 |
| F | 0 | 0 | 1 | 0 | 0 | 0 | 2 | 0 | 0 | 0 |
| $SiO_2/(SiO_2 + B_2O_3)$ | 0.346 | 0.474 | 0.472 | 0.381 | 0.322 | 0.496 | 0.397 | 0.437 | 0.479 | 0.31 |
| $Y_2O_3/(La_2O_3 + Gd_2O_3 + Y_2O_3 + Yb_2O_3)$ | 0.149 | 0.087 | 0.029 | 0.052 | 0.052 | 0.134 | 0.035 | 0.142 | 0.047 | 0.016 |
| $Y_2O_3/(La_2O_3 + Gd_2O_3 + Y_2O_3)$ | 0.15 | 0.089 | 0.031 | 0.052 | 0.058 | 0.149 | 0.038 | 0.149 | 0.047 | 0.016 |
| $TiO_2/Nb_2O_5$ | 0.045 | 0.097 | 0.285 | 0.101 | 0.271 | 0.248 | 0.135 | 0.235 | 0.141 | 0.167 |
| $Nb_2O_5/(Nb_2O_5 + TiO_2 + ZrO_2)$ | 0.75 | 0.66 | 0.537 | 0.72 | 0.644 | 0.52 | 0.764 | 0.635 | 0.742 | 0.526 |
| $(Nb_2O_5 + Ta_2O_5 + ZrO_2)/(SiO_2 + B_2O_3)$ | 0.364 | 0.883 | 0.692 | 0.964 | 0.547 | 0.702 | 0.993 | 0.471 | 0.858 | 0.768 |
| $(ZnO + Y_2O_3)/La_2O_3$ | 0.27 | 0.159 | 0.057 | 0.102 | 0.143 | 0.218 | 0.171 | 0.282 | 0.176 | 0.025 |
| nd | 1.875 | 1.904 | 1.895 | 1.883 | 1.869 | 1.892 | 1.910 | 1.904 | 1.896 | 1.884 |
| vd | 37.68 | 37.09 | 38.33 | 38.27 | 39.64 | 38.47 | 38.14 | 38.26 | 40.25 | 39.22 |
| λ70 | 384 | 385 | 382 | 378 | 384 | 384 | 379 | 380 | 381 | 380 |
| ρ (g/cm³) | 5.1961 | 5.241 | 5.231 | 5.204 | 5.198 | 5.221 | 5.207 | 5.235 | 5.195 | 5.17 |
| Tg (° C.) | 719 | 727 | 723 | 724 | 719 | 724 | 728 | 730 | 725 | 721 |
| $D_W$ | Category 1 | Category 1 | Category 1 | Category 1 | Category 1 | Category 1 | Category 1 | Category 1 | Category 1 | Category 1 |
| $D_A$ | Category 1 | Category 1 | Category 1 | Category 1 | Category 1 | Category 1 | Category 1 | Category 1 | Category 1 | Category 1 |

TABLE 2

| Composition | Embodiments 11 | 12 | 13 | 14 | 15 | 16 | 17 | 18 | 19 | 20 |
|---|---|---|---|---|---|---|---|---|---|---|
| $B_2O_3$ | 13.91 | 3.35 | 14.38 | 19.24 | 15.47 | 11.37 | 14.4 | 15.24 | 12.34 | 13.24 |
| $SiO_2$ | 9.22 | 2.16 | 10.39 | 5.21 | 9.55 | 7.88 | 3.52 | 9.14 | 7.39 | 7.94 |
| $La_2O_3$ | 31.15 | 49.15 | 44.69 | 30.5 | 32.47 | 32.79 | 40.56 | 35.54 | 42.26 | 37.83 |
| $Gd_2O_3$ | 26.68 | 21.5 | 11.01 | 9.12 | 18 | 19.37 | 10.08 | 9.4 | 13.39 | 12.41 |
| $Y_2O_3$ | 3.12 | 12 | 7.36 | 4.91 | 3.25 | 4.79 | 6.37 | 7.14 | 4.15 | 5.58 |
| $Yb_2O_3$ | 1.25 | 0 | 0 | 1.33 | 0 | 0 | 2.54 | 0 | 0 | 1.2 |
| $ZrO_2$ | 2.36 | 1 | 2.17 | 2.14 | 3.11 | 3.14 | 4.98 | 4.11 | 5.14 | 6.26 |
| $Nb_2O_5$ | 5.14 | 1 | 4.52 | 15.54 | 6.17 | 10.65 | 12.4 | 13.15 | 7.36 | 8.34 |
| $Ta_2O_5$ | 1.64 | 2.15 | 0 | 4.71 | 0 | 0 | 0 | 0 | 1.52 | 0.34 |
| $TiO_2$ | 1.21 | 0.1 | 1.31 | 3 | 1.67 | 1.39 | 0.94 | 0.62 | 1.32 | 1.74 |
| $WO_3$ | 2.64 | 0 | 1.31 | 0 | 0 | 0 | 0 | 0 | 0.74 | 0.67 |
| ZnO | 0 | 1.47 | 0 | 1.54 | 2.14 | 2.68 | 1.74 | 3.21 | 1.52 | 1.47 |
| $R_2O$ | 0 | 0 | 1.47 | 0 | 1.22 | 3.04 | 0 | 0 | 0 | 0.54 |
| RO | 0.53 | 3.03 | 0 | 2.66 | 0 | 0 | 2.37 | 0 | 1.32 | 0 |
| $Al_2O_3$ | 1.00 | 0 | 1.19 | 0 | 4.31 | 1.33 | 0 | 1.71 | 0 | 0 |
| $GeO_2$ | 0 | 2.71 | 0 | 0 | 2.54 | 1.47 | 0 | 0.64 | 1.35 | 2.14 |
| $Bi_2O_3$ | 0 | 0 | 0 | 0 | 0 | 0 | 0 | 0 | 0 | 0 |
| $Sb_2O_3$ | 0.15 | 0 | 0 | 0 | 0.1 | 0 | 0 | 0.1 | 0 | 0 |
| $SnO_2$ | 0 | 0.38 | 0 | 0.1 | 0 | 0.1 | 0 | 0 | 0.2 | 0.3 |
| $CeO_2$ | 0 | 0 | 0.2 | 0 | 0 | 0 | 0.1 | 0 | 0 | 0 |
| F | 0 | 0 | 0 | 0 | 0 | 0 | 0 | 0 | 0 | 0 |
| $SiO_2/(SiO_2 + B_2O_3)$ | 0.399 | 0.392 | 0.419 | 0.213 | 0.382 | 0.409 | 0.196 | 0.375 | 0.375 | 0.375 |
| $Y_2O_3/(La_2O_3 + Gd_2O_3 + Y_2O_3 + Yb_2O_3)$ | 0.05 | 0.145 | 0.117 | 0.107 | 0.06 | 0.084 | 0.107 | 0.137 | 0.069 | 0.098 |

TABLE 2-continued

| Composition | Embodiments | | | | | | | | | |
|---|---|---|---|---|---|---|---|---|---|---|
| | 11 | 12 | 13 | 14 | 15 | 16 | 17 | 18 | 19 | 20 |
| $Y_2O_3/(La_2O_3 + Gd_2O_3 + Y_2O_3)$ | 0.051 | 0.145 | 0.117 | 0.11 | 0.06 | 0.084 | 0.112 | 0.137 | 0.069 | 0.1 |
| $TiO_2/Nb_2O_5$ | 0.235 | 0.1 | 0.29 | 0.193 | 0.271 | 0.131 | 0.076 | 0.047 | 0.179 | 0.209 |
| $Nb_2O_5/(Nb_2O_5 + TiO_2 + ZrO_2)$ | 0.59 | 0.476 | 0.565 | 0.751 | 0.563 | 0.702 | 0.677 | 0.735 | 0.533 | 0.510 |
| $(Nb_2O_5 + Ta_2O_5 + ZrO_2)/(SiO_2 + B_2O_3)$ | 0.395 | 0.753 | 0.27 | 0.916 | 0.371 | 0.716 | 0.97 | 0.708 | 0.711 | 0.705 |
| $(ZnO + Y_2O_3)/La_2O_3$ | 0.1 | 0.274 | 0.165 | 0.211 | 0.166 | 0.228 | 0.2 | 0.291 | 0.134 | 0.186 |
| nd | 1.874 | 1.918 | 1.895 | 1.905 | 1.911 | 1.875 | 1.867 | 1.863 | 1.885 | 1.894 |
| vd | 39.34 | 37.01 | 38.67 | 37.69 | 37.12 | 41.08 | 39.67 | 38.45 | 39.17 | 37.69 |
| λ70 | 379 | 378 | 379 | 381 | 382 | 382 | 381 | 379 | 380 | 379 |
| ρ (g/cm³) | 5.224 | 5.236 | 5.199 | 5.210 | 5.207 | 5.226 | 5.225 | 5.218 | 5.206 | 5.215 |
| Tg (° C.) | 718 | 716 | 719 | 718 | 719 | 717 | 716 | 724 | 719 | 723 |
| $D_W$ | Category 1 | Category 1 | Category 1 | Category 1 | Category 1 | Category 1 | Category 1 | Category 1 | Category 1 | Category 1 |
| $D_A$ | Category 1 | Category 2 | Category 1 | Category 1 | Category 1 | Category 1 | Category 1 | Category 1 | Category 1 | Category 1 |

TABLE 3

| Composition | Embodiment | | | | | | | | | |
|---|---|---|---|---|---|---|---|---|---|---|
| | 21 | 22 | 23 | 24 | 25 | 26 | 27 | 28 | 29 | 30 |
| $B_2O_3$ | 12.34 | 12.3 | 15.33 | 14.47 | 13.64 | 13.37 | 14.32 | 13.68 | 12.39 | 14.22 |
| $SiO_2$ | 9.99 | 7.14 | 6.39 | 9.98 | 8.06 | 7.16 | 6.37 | 6.19 | 5.94 | 6.85 |
| $La_2O_3$ | 38.1 | 40.6 | 36.83 | 31.97 | 35.62 | 31.42 | 35.33 | 41.93 | 39.45 | 36.64 |
| $Gd_2O_3$ | 15.44 | 19.22 | 16.47 | 17.22 | 19.53 | 18.86 | 11.54 | 15.59 | 14.68 | 16.34 |
| $Y_2O_3$ | 4.31 | 4.39 | 3.91 | 4.18 | 9.45 | 8.49 | 9.53 | 4.26 | 9.29 | 4.18 |
| $Yb_2O_3$ | 0 | 0 | 0 | 0 | 0 | 0 | 1.36 | 0 | 0 | 0 |
| $ZrO_2$ | 4.36 | 3.42 | 5.44 | 7.33 | 4.18 | 7.66 | 4.15 | 6.47 | 5.39 | 6.38 |
| $Nb_2O_5$ | 7.62 | 9.14 | 8.27 | 10.17 | 8.24 | 9.37 | 7.18 | 8.34 | 8.65 | 7.19 |
| $Ta_2O_5$ | 1.36 | 0 | 0 | 0 | 0 | 0 | 3.67 | 0 | 0 | 0 |
| $TiO_2$ | 1.39 | 1.64 | 1.39 | 0.37 | 1.28 | 0 | 1.64 | 1.39 | 0.85 | 1.4 |
| $WO_3$ | 0 | 0 | 0 | 0 | 0 | 0 | 0 | 0 | 0 | 0 |
| ZnO | 0 | 2.15 | 2.47 | 0 | 0 | 0 | 2.44 | 0 | 0 | 2.37 |
| $R_2O$ | 0 | 0 | 2.16 | 0 | 0 | 0 | 0 | 0 | 0 | 0 |
| RO | 0 | 0 | 0 | 0 | 0 | 0 | 0 | 0 | 0 | 0 |
| $Al_2O_3$ | 2.41 | 0 | 1.34 | 4.31 | 0 | 0 | 2.47 | 0 | 0 | 2.69 |
| $GeO_2$ | 2.68 | 0 | 0 | 0 | 0 | 3.67 | 0 | 2.15 | 3.36 | 1.74 |
| $Bi_2O_3$ | 0 | 0 | 0 | 0 | 0 | 0 | 0 | 0 | 0 | 0 |
| $Sb_2O_3$ | 0 | 0 | 0 | 0 | 0 | 0 | 0 | 0 | 0 | 0 |
| $SnO_2$ | 0 | 0 | 0 | 0 | 0 | 0 | 0 | 0 | 0 | 0 |
| $CeO_2$ | 0 | 0 | 0 | 0 | 0 | 0 | 0 | 0 | 0 | 0 |
| F | 0 | 0 | 0 | 0 | 0 | 0 | 0 | 0 | 0 | 0 |
| $SiO_2/(SiO_2 + B_2O_3)$ | 0.447 | 0.367 | 0.294 | 0.408 | 0.371 | 0.349 | 0.308 | 0.312 | 0.324 | 0.325 |
| $Y_2O_3/(La_2O_3 + Gd_2O_3 + Y_2O_3 + Yb_2O_3)$ | 0.075 | 0.068 | 0.068 | 0.078 | 0.146 | 0.144 | 0.165 | 0.069 | 0.146 | 0.031 |
| $Y_2O_3/(La_2O_3 + Gd_2O_3 + Y_2O_3)$ | 0.075 | 0.068 | 0.068 | 0.078 | 0.146 | 0.144 | 0.169 | 0.069 | 0.146 | 0.073 |
| $TiO_2/Nb_2O_5$ | 0.182 | 0.179 | 0.168 | 0.036 | 0.155 | 0 | 0.228 | 0.167 | 0.098 | 0.195 |
| $Nb_2O_5/(Nb_2O_5 + TiO_2 + ZrO_2)$ | 0.57 | 0.644 | 0.548 | 0.569 | 0.601 | 0.55 | 0.554 | 0.515 | 0.581 | 0.480 |
| $(Nb_2O_5 + Ta_2O_5 + ZrO_2)/(SiO_2 + B_2O_3)$ | 0.597 | 0.646 | 0.631 | 0.716 | 0.572 | 0.83 | 0.725 | 0.745 | 0.766 | 0.644 |
| $(ZnO + Y_2O_3)/La_2O_3$ | 0.113 | 0.161 | 0.173 | 0.131 | 0.265 | 0.27 | 0.339 | 0.102 | 0.235 | 0.179 |
| nd | 1.896 | 1.892 | 1.890 | 1.887 | 1.893 | 1.895 | 1.892 | 1.889 | 1.890 | 1.888 |
| vd | 39.47 | 38.94 | 39.16 | 39.55 | 39.62 | 38.69 | 39.16 | 39.34 | 38.99 | 40.09 |
| λ70 | 378 | 379 | 380 | 378 | 381 | 382 | 379 | 378 | 382 | 379 |
| ρ (g/cm³) | 5.231 | 5.124 | 5.206 | 5.135 | 5.119 | 5.134 | 5.233 | 5.141 | 5.135 | 5.128 |
| Tg (° C.) | 718 | 717 | 721 | 718 | 720 | 722 | 716 | 720 | 719 | 718 |
| $D_W$ | Category 1 | Category 2 | Category 1 | Category 1 | Category 1 | Category 1 | Category 1 | Category 1 | Category 2 | Category 1 |
| $D_A$ | Category 1 | Category 1 | Category 1 | Category 2 | Category 1 | Category 2 | Category 1 | Category 1 | Category 1 | Category 1 |

TABLE 4

| Composition | Embodiment | | | | |
|---|---|---|---|---|---|
| | 31 | 32 | 33 | 34 | 35 |
| $B_2O_3$ | 13.2 | 13.6 | 14.0 | 14.0 | 14.0 |
| $SiO_2$ | 6.5 | 6.6 | 6.5 | 6.5 | 6.5 |
| $La_2O_3$ | 45.0 | 45.5 | 39.3 | 39.5 | 36.9 |
| $Gd_2O_3$ | 12.0 | 13.5 | 17.2 | 16.0 | 22.0 |
| $Y_2O_3$ | 6.0 | 4.0 | 6.5 | 7.0 | 4.6 |
| $Yb_2O_3$ | 0 | 0 | 0 | 0 | 0 |
| $ZrO_2$ | 5.5 | 6.3 | 6.6 | 6.0 | 6.1 |
| $Nb_2O_5$ | 9.3 | 9.0 | 8.0 | 8.5 | 8.3 |
| $Ta_2O_5$ | 0 | 0 | 0 | 0 | 0 |
| $TiO_2$ | 1.5 | 1.5 | 1.9 | 1.5 | 1.6 |
| $WO_3$ | 0 | 0 | 0 | 1.0 | 0 |
| ZnO | 1.0 | 0 | 0 | 0 | 0 |
| $R_2O$ | 0 | 0 | 0 | 0 | 0 |
| RO | 0 | 0 | 0 | 0 | 0 |
| $Al_2O_3$ | 0 | 0 | 0 | 0 | 0 |
| $GeO_2$ | 0 | 0 | 0 | 0 | 0 |
| $Bi_2O_3$ | 0 | 0 | 0 | 0 | 0 |
| $Sb_2O_3$ | 0 | 0 | 0 | 0 | 0 |
| $SnO_2$ | 0 | 0 | 0 | 0 | 0 |
| $CeO_2$ | 0 | 0 | 0 | 0 | 0 |
| F | 0 | 0 | 0 | 0 | 0 |
| $SiO_2/(SiO_2 + B_2O_3)$ | 0.33 | 0.327 | 0.317 | 0.317 | 0.317 |
| $Y_2O_3/(La_2O_3 + Gd_2O_3 + Y_2O_3 + Yb_2O_3)$ | 0.095 | 0.064 | 0.103 | 0.112 | 0.072 |
| $Y_2O_3/(La_2O_3 + Gd_2O_3 + Y_2O_3)$ | 0.095 | 0.064 | 0.103 | 0.112 | 0.072 |
| $TiO_2/Nb_2O_5$ | 0.161 | 0.167 | 0.238 | 0.176 | 0.193 |
| $Nb_2O_5/(Nb_2O_5 + TiO_2 + ZrO_2)$ | 0.571 | 0.536 | 0.485 | 0.531 | 0.519 |
| $(Nb_2O_5 + Ta_2O_5 + ZrO_2)/(SiO_2 + B_2O_3)$ | 0.751 | 0.757 | 0.712 | 0.707 | 0.702 |
| $(ZnO + Y_2O_3)/La_2O_3$ | 0.156 | 0.088 | 0.165 | 0.177 | 0.125 |
| nd | 1.886 | 1.882 | 1.8880 | 1.887 | 1.883 |
| vd | 39.47 | 38.94 | 39.16 | 39.55 | 39.62 |
| λ70 | 378 | 379 | 380 | 378 | 381 |
| ρ (g/cm$^3$) | 5.131 | 5.124 | 5.206 | 5.135 | 5.119 |
| Tg(° C.) | 718 | 717 | 721 | 718 | 720 |
| $D_W$ | Category 1 | Category 1 | Category 1 | Category 1 | Category 1 |
| $D_A$ | Category 1 | Category 1 | Category 1 | Category 1 | Category 1 |

[Optical Preform Embodiment]

The optical glass obtained in Embodiment 1 in Table 1 is cut into a predetermined size, and a release agent made of boron nitride powder is uniformly coated on the surface, and then is heated and softened to be press-molded to produce a concave meniscus lens, a convex meniscus lens, a biconvex lens, a biconcave lens, a planoconvex lens, a planoconcave lens, and other various lens and prism preforms.

[Optical Element Embodiment]

The preforms obtained in the above-mentioned optical preform embodiment are annealed for fine-tuning while the deformation inside the glass is reduced, so that the optical characteristics such as the refractive index are brought to the desired values.

Then, each of the preforms is ground and polished, and a variety of lenses and prisms such as concave meniscus lens, convex meniscus lens, biconvex lens, biconcave lens, planoconvex lens, and planoconcave lens are prepared. An anti-reflection film may be coated on the surface of the obtained optical element.

The present invention provides a high-refraction low-dispersion optical glass having a low cost and excellent transmittance, with glass refractive index of more than 1.85 and Abbe number of 35-45, and an optical element made of the glass, which can meet the demands of modern novel photoelectric products.

The invention claimed is:

1. An optical glass comprising by weight percentage: $B_2O_3$: 1-30%; $SiO_2$: 0-20%; $La_2O_3$: 25-55%; $Gd_2O_3$: 5-40%; $Y_2O_3$: 0-25%; $Yb_2O_3$: 0-10%; $Ta_2O_5$: 0-10%; $Nb_2O_5$: 1-30%; $TiO_2$: 0-10%; $TiO_2/Nb_2O_5$: less than 0.25; $ZrO_2$: 0.5-20%; $WO_3$: 0-10%; ZnO: 0-15%; $(ZnO+Y_2O_3)/La_2O_3$: less than 0.5; $R_2O$: 0-10%, in which $R_2O$ is at least one of $Li_2O$, $Na_2O$ or $K_2O$; RO: 0-10%, in which, RO is at least one of BaO, SrO, MgO or CaO; $Al_2O_3$: 0-10%; $GeO_2$: 0-10%; $Bi_2O_3$: 0-10%; the glass contains no PbO; the glass has a refractive index of from 1.88 to 1.91, and an Abbe number of 35-45,
wherein
$Nb_2O_5/(Nb_2O_5+TiO_2+ZrO_2)$ is 0.4-0.519;
$(Nb_2O_5+Ta_2O_5+ZrO_2)/(SiO_2+B_2O_3)$ is 0.6-0.768; and
$Nb_2O_5$ is greater than $ZrO_2$.

2. The optical glass according to claim 1, optionally containing at least one of: $Sb_2O_3$: 0-1%; $SnO_2$: 0-1%; or $CeO_2$: 0-1%.

3. The optical glass according to claim 2, wherein $B_2O_3$: 5-25%; $SiO_2$: 0.1-15%; $La_2O_3$: 30-52%; $Gd_2O_3$: 5-35%; $Y_2O_3$: 1-20%; $Ta_2O_5$: 0-5%; $Nb_2O_5$: 2-25%; $TiO_2$: 0.1-5%; $ZrO_2$: 1-15%; $WO_3$: 0-5%; ZnO: 0-10%; $R_2O$: 0-5%; RO: 0-5%; $Al_2O_3$: 0-5%; $GeO_2$: 0-5%; $Bi_2O_3$: 0-5%; $Sb_2O_3$: 0-0.5%; $SnO_2$: 0-0.5%; and $CeO_2$: 0-0.5%.

4. The optical glass according to claim 1, wherein $SiO_2/(SiO_2+B_2O_3)$ is below 0.5; $Y_2O_3/(La_2O_3+Gd_2O_3+Y_2O_3)$ is below 0.2, and $(ZnO+Y_2O_3)/La_2O_3$ is in the range of 0.05-0.3.

5. The optical glass according to claim 1, wherein $SiO_2/(SiO_2+B_2O_3)$ is 0.25-0.4; $Y_2O_3/(La_2O_3+Gd_2O_3+Y_2O_3)$ is 0.05-0.12;
$Nb_2O_5/(Nb_2O_5+TiO_2+ZrO_2)$ is 0.48-0.519; and $(ZnO+Y_2O_3)/La_2O_3$ is of 0.08-0.15.

6. The optical glass according to claim 1, wherein $WO_3$: 0-4%.

7. The optical glass according to claim 1, wherein the glass has an Abbe number from 37 to 41.

8. The optical glass according to claim 1, wherein the glass has a refractive index from 1.88 to 1.90, and an Abbe number from 38 to 40.

9. A glass preform made of the optical glass according to claim 1.

10. An optical element made of the optical glass according to claim 1.

* * * * *